Figure 1:
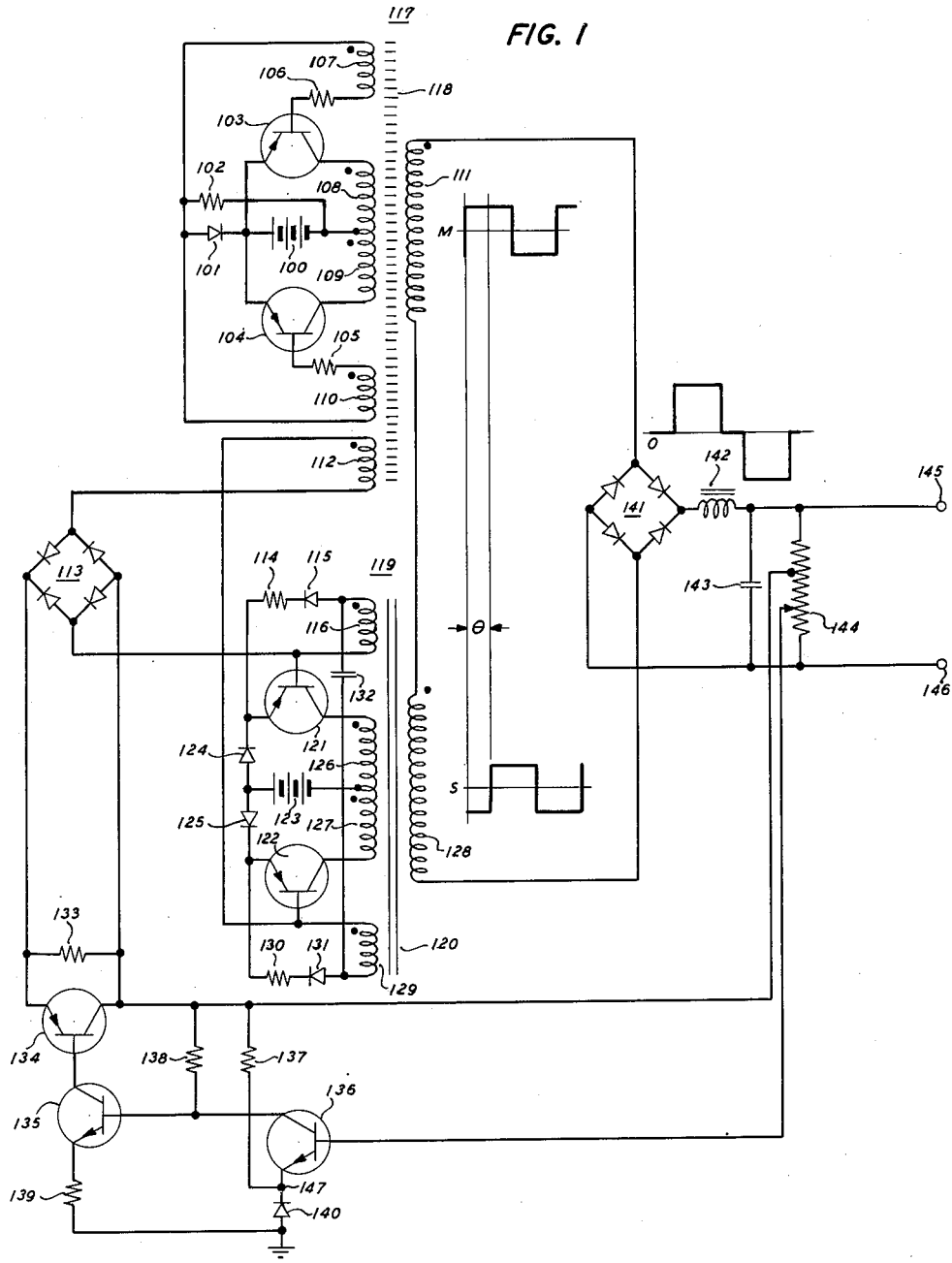

April 24, 1962     F. V. KADRI     3,031,629
POWER SUPPLY SYSTEM

Filed Aug. 16, 1960     3 Sheets-Sheet 1

INVENTOR
F. V. KADRI
BY V. P. Priolo
ATTORNEY

April 24, 1962     F. V. KADRI     3,031,629
POWER SUPPLY SYSTEM

Filed Aug. 16, 1960     3 Sheets-Sheet 2

INVENTOR
F. V. KADRI
BY
ATTORNEY

INVENTOR
F. V. KADRI
BY
ATTORNEY

United States Patent Office 3,031,629
Patented Apr. 24, 1962

3,031,629
POWER SUPPLY SYSTEM
Fred V. Kadri, Madison, N.J., assignor to Bell Telephone Laboratories, Incorporated, New York, N.Y., a corporation of New York
Filed Aug. 16, 1960, Ser. No. 50,039
8 Claims. (Cl. 331—113)

This invention relates to power supply systems and, more particularly, to a system for converting a direct current input supply to either a regulated alternating or direct current output.

In many electrical and electronic systems ranging in scope from high fidelity audio to guided missiles it is important to employ power systems which amplify direct current and supply it at a constant magnitude to a given load. Such power supply systems must possess an extremely high degree of reliability with a relatively high order of absolute current stabilization. Power supply systems of the transistor core inverter type are small, efficient and require no maintenance. They possess the required degree of reliability and stability and, therefore, qualify for broad application.

The inverter regulator circuit generally employs a plurality of transistors and a saturating transformer for converting direct current to alternating current which, in turn, may be rectified. The transistors function as automatic switches to complete circuits for supplying current from a direct-current source to a portion of a transformer winding alternately in opposite directions. Each circuit is completed through a transistor switch, the switching or "on" period of which is usually determined by the saturating transformer core saturation. Such inverter configurations are usually self-excited although two such configurations may be combined so that a self-excited (master) inverter drives a separately excited (slave) inverter with the whole configuration referred to as a separately excited inverter. The advantages of separately exciting inverters lie in the ease of starting, improved transformer and transistor utilization, and elimination of large transient voltages. However, these advantages are obtained only at the expense of extra circuitry which is the major disadvantage.

The prior art has taught a variety of transistor regulator circuits for obtaining an alternating-current output from a variable direct-current source. Some of these arrangements, although somewhat complex, are inherently efficient while others, though more simple in construction, are poor in efficiency. These circuits may be categorized into one of two groups depending upon whether the regulation takes place before or after the power inverter stage. In the first group would be, for example, a direct-current regulator placed ahead of a transistor inverter, or the pulse width modulation of a drive signal to a power stage. In the second group are those arrangements wherein a power inverter is permitted to run freely and control is applied at its output as, for instance, by a magnetic amplifier.

It is, therefore, an object of this invention to provide an inverter regulator circuit which is both simple and efficient but which does not fall into either of the two groups mentioned above.

Another object of this invention is to provide an inverter regulator circuit without control circuitry either before or after the power converter stage.

Another object of this invention is to provide an inverter regulator circuit capable of functioning at high operating potentials.

It has been found that these objectives may be achieved by employing a master-slave inverter configuration wherein regulation is achieved by means of phase feedback.

A feature of this invention resides in the use of a self-excited master inverter coupled by phase feedback controlled means to drive a separately excited inverter. The outputs of the inverters are serially combined to yield a regulated output.

Figure 2:
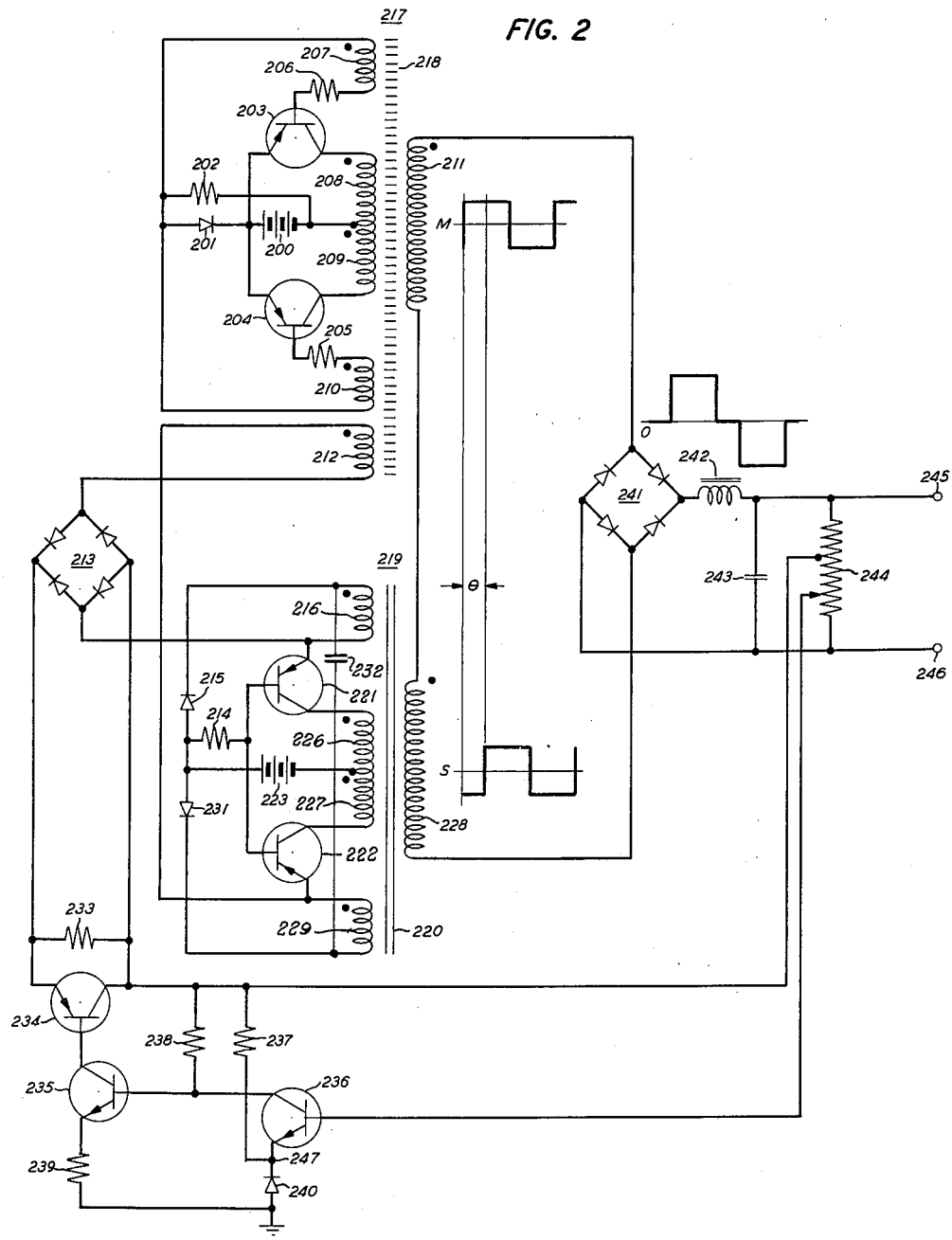
Figure 3:
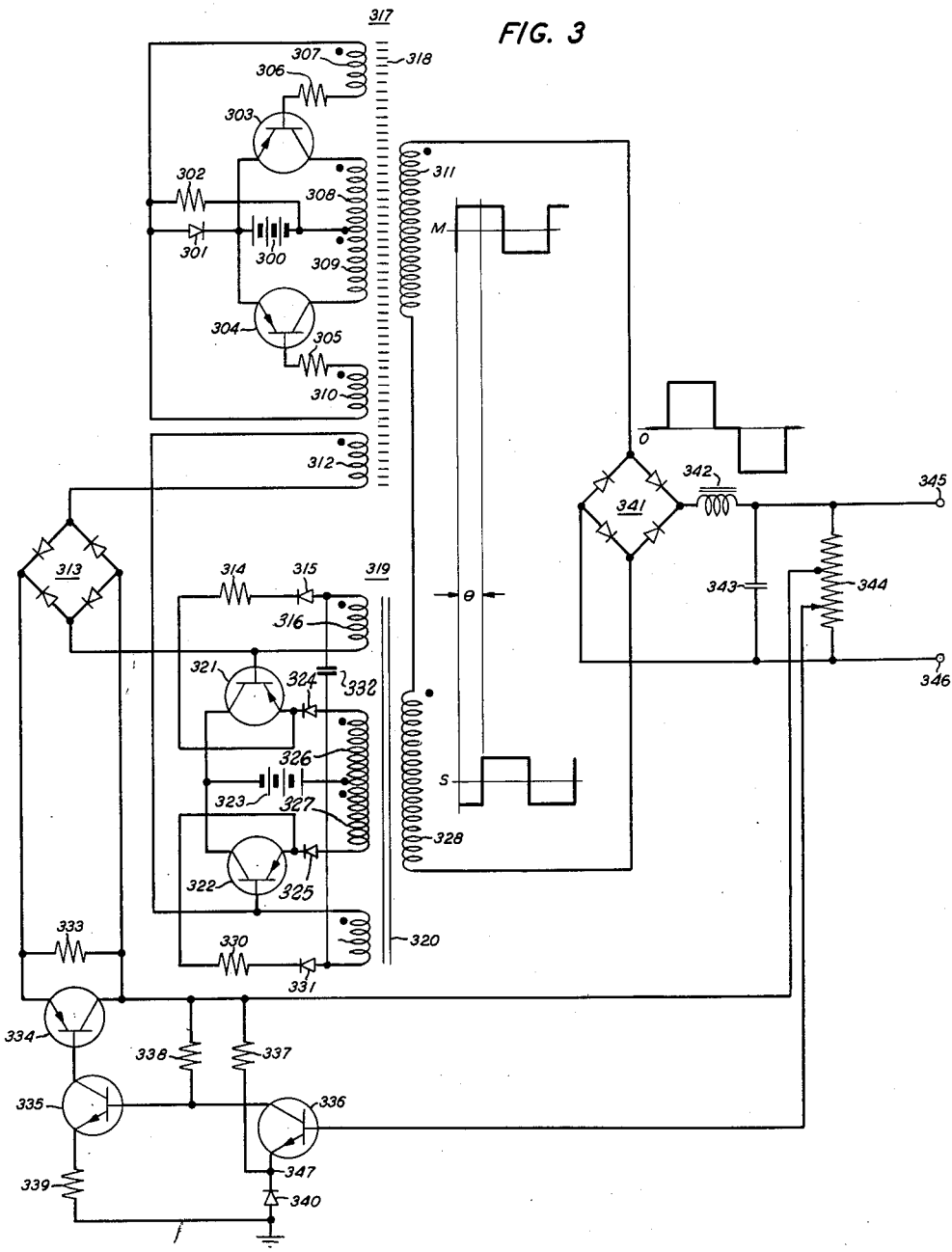

Other objects and features of the present invention will become apparent upon consideration of the following detailed description when taken in connection with the accompanying drawing in which:

FIG. 1 is a schematic representation of an electrical circuit comprising a common emitter slave inverter embodiment of the invention; and FIGS. 2 and 3 are schematic representations of electrical circuits comprising common base and common collector slave inverter embodiments, respectively, of the invention.

Referring now to FIG. 1 of the drawing, there is provided a self-excited master inverter with a transformer 117 having windings or winding portions 107, 108, 109, 110, 111, and 112 wound on a core 118 of saturable magnetic material preferably having a high permeability and substantailly rectangular hysteresis loop, p-n-p transistors 103 and 104, a direct-current supply source 100, starting resistor 102, starting asymmetrically conducting device 101 and base current limiting resistors 105 and 106. There is also provided a separately excited slave inverter with a transformer 119 having windings or winding portions 116, 126, 127, 128, and 129 wound on a nonsaturable core 120, p-n-p transistors 121 and 122, a direct-current supply source 123, base current limiting resistors 114 and 130, asymmetrically conducting devices 115, 124, 125 and 131, a capacitor 132, a resistor 133, and a bridge rectifier 113. The outputs of the master and slave inverters are taken across windings 111 and 128, respectively, and are serially connected to bridge rectifier 141, the output of which is filtered by inductor 142 and capacitor 143. Terminals 145 and 146 are output terminals. Resistor 144 provides an adjustable feedback output sampling means which is, in turn, connected to a regulator network comprising n-p-n transistors 135 and 136, p-n-p transistor 134, biasing diode 140, and biasing resistors 137, 138 and 139. It should be understood that combinations of p-n-p and n-p-n transistors other than those discussed in the foregoing description could be used equally as effectively.

One terminal of the direct-current supply source 100 is connected to the common terminal of winding portions 108 and 109. One terminal of winding 107 is connected to a terminal of winding 110. The other terminal of the direct-current supply source 100 is connected to the emitter terminals of transistors 103 and 104. Asymmetrically conducting device 101 connects the emitter terminals of transistors 103 and 104 to the common terminal of windings 107 and 110. The common terminal of windings 107 and 110 is connected to the common terminal of windings 108 and 109 by starting resistor 102. The other terminal of winding portion 108 is connected to the collector electrode of transistor 103 while the other terminal of winding portion 109 is connected to the collector electrode of transistor 104. The base electrode of transistor 103 is connected to the other terminal of winding 107 by base current limiting resistor 106. The base electrode of transistor 104 is connected to the other terminal of winding 110 by base current limiting resistor 105.

The master inverter is coupled to the slave inverter by a series network comprising winding 112, winding 129, the capacitor 132, winding 116, and full-wave rectifier 113. Resistor 133 is shunted across the output of the full-wave rectifier 113. One terminal of the direct-current supply source 123 is connected to the common terminal of winding portions 126 and 127. The other terminal of the direct-current supply source 123 is connected to the junction of asymmetrically conducting devices 124 and 125. The direct-current supply sources 100 and 123 may be either the same source or separate sources depending upon the desired application. The collector of transistor 121 is connected to the other terminal of winding portion 126 while the collector of transistor 122 is connected to the other terminal of winding portion 127. The emitter of transistor 121 is connected to asymmetrically conducting device 124 and the emitter of transistor 122 is connected to asymmetrically conducting device 125. The base of transistor 121 is serially connected to winding 116, asymmetrically conducting device 115, base current limiting resistor 114, and the emitter of transistor 121. The base of transistor 122 is serially connected to winding 129, asymmetrically conducting device 131, base current limiting resistor 130 and the emitter of transistor 122.

Windings 111 and 128 are serially connected to the full-wave rectifier 141 across the output of which is a filter comprising inductor 142 and capacitor 143. Resistor 144 is shunted across the regulator output terminals 145 and 146. A first predetermined value of output voltage is connected to the base of the error-detecting transistor 136 which is biased by Zener asymmetrically conducting device 140 connected between the emitter of transistor 136 and ground, and resistor 137 connected between the emitter of transistor 136 and a second predetermined value of the output voltage impressed across resistor 144. Amplifying transistor 135 is biased by resistor 138 connected from said second predetermined value of output voltage to the base of transistor 135 and resistor 139 connected from the emitter of transistor 135 to ground. The collector of transistor 136 is connected to the base of transistor 135. The collector of transistor 135 is connected to the base of transistor 134. The collector and emitter of transistor 134 are connected across the resistor 133. The collector of transistor 134 is connected to the said second predetermined value of voltage.

Since the dot convention is referred to frequently in the following discussion it is defined at this point. Briefly, the dot convention refers to a means whereby the polarity of a voltage induced in a winding can be ascertained at any instant in the cycle of operation. For purposes of this description, whatever a dot appears in relation to a winding, the polarity of the voltage induced in that winding has the same polarity as the voltage induced at the dot of every winding in the same magnetic field.

When the direct-current supply source 100 is applied current flows through the emitter base electrodes of transistors 103 and 104 and back through resistor 102 to the source 100. Asymmetrically conducting device 101 prevents any reverse current flow. Although the transistors are of the same conductivity type and have the same rating, the current gain of any one of the transistors will not be equal to the gain of the other. The transistor with the higher gain will be faster acting, that is, the current in the emitter-collector path will increase at a higher rate which is all that is necessary to start the converter's push-pull mode of operation. Only slight variations in transistor characteristics are necessary since there is a current flow in the base-emitter path of each transistor. Assuming that transistor 103 is thus biased "on," current will flow from the direct-current supply source 100 through the collector-emitter path of transistor 103 into the dot of winding portion 108 and back to the source 100. Tracing the induced voltages with the aid of the dot convention, it is noted that transistor 103 is biased further into conduction while transistor 104 is biased further into cutoff. This process continues until the current flow into winding portion 108 reaches such a value that the saturating transformer core 118 is saturated and no further change of flux can occur. At this point, the voltage induced in the base-emitter bias windings falls to zero; hence, the collector-emitter current flow is reduced to zero which, in turn, causes the flux in saturating transformer 117 to collapse. The collapsing flux induces a voltage in windings 107, 110 and 112 of the opposite polarity to the previous base-to-emitter bias voltages. This new bias voltage causes transistor 104 to conduct and cuts off transistor 103. Current now flows from the direct-current supply source 100 through the collector-emitter path of transistor 104 and winding portion 109 back to the supply source 100. This current, as before, induces larger base-to-emitter bias voltages rendering transistor 104 more conductive and driving transistor 103 further into cutoff. This process again continues till the saturating transformer core 118 again becomes saturated and the cycle repeats itself. The oscillatory cycle will continue until the direct-current supply source 100 is removed.

The square-wave voltage induced in winding 112 drives the slave inverter. Assuming transistor 103 is conducting, and following the dot convention, it is seen that a negative potential is applied at the base of transistor 121 while a positive potential is applied at the base of transistor 122. For illustrative purposes, it is assumed that the capacitor 132 is initially charged to a voltage value V, positive at the base of transistor 121 and negative at the base of transistor 122 and that trasistor 122 is conducting while transistor 121 is cut off. As shown by the dot convention, as the current flow in winding portion 127 increases, transistor 122 is being driven further into conduction while transistor 121 is being driven further into cutoff. The capacitor 132 discharges and charges exponentially with time through winding 129, winding 112, full-wave rectifier 113, resistor 133, rectifier 113 and winding 116. When the capacitor 132 has discharged and charged sufficiently so that the potential at the base of transistor 121 is low enough to permit transistor 121 to conduct, it will be readily seen that transistor 122 will be driven into cutoff. At this point, it should be noted that the length of time it takes the capacitor 132 to discharge and charge introduces a phase delay between the outputs of the master and slave inverters. Since there is complete circuit symmetry the value of the chareg V on capacitor 132 must be equal and opposite for alternate half cycles. The positive potential appearing at the base of transistor 122 due to the charge on capacitor 132 tends to hold transistor 122 in cutoff. Since the conducting transistor of the slave inverter goes into and out of saturation rather rapidly because of the manner in which the drive is applied, the output of the slave inverter is substantially a square wave.

When the master inverter switches so that transistor 103 is cut off and transistor 104 is conducting the sequence is repeated except that the capacitor 132 discharges and charges in the opposite direction so that transistor 122 is conducting and transistor 121 is cut off. The cycle then continually repeats itself until either one of the direct-current sources 100 or 123 is removed.

Resistors 114 and 130 are base current limiting resistors. Asymmetrically conducting device 125 is placed between one of the terminals of the direct current supply source 123 and the emitter of transistor 122 to eliminate the additional current path which would otherwise exist across the capacitor 132 by virtue of the base resistor 130 and the emitter-base junction of transistor 121. Asymmetrically conducting device 124 also performs a similar function during the succeeding half cycle. Also, during the latter part of the nonconducting half cycle of each transistor the winding connected ends of its base resistors (114 and 130) become negative relative to the positive supply terminal and, consequently, asymmetrically conducting devices 115 and 131 are inserted to prevent reverse current flow through the base resistor during these intervals.

As discussed, the output voltage of the slave inverter induced in winding 128 will phase lag the output voltage of the master inverter induced in winding 111. The phase lag is shown as $\theta$ on the drawing with the output of the master inverter labeled M and the slave output labeled S. The combined output O is applied to the input of the fullwave rectifier 141. The output of the fullwave rectifier is filtered by inductor 142 and capacitor 143 and applied to load terminals 145 and 146. Resistor 144 is shunted across the load and will reflect output voltage variations. A predetermined amount of the output voltage is sampled by a comparator (error detecting) transistor 136 and amplified by transistor 135.

The operation of the regulated arrangement can be described as follows: If the output voltage developed across terminals 145 and 146 becomes more positive with respect to its normal operating level, transistor 136 operates to compare the more positive-going signal with the reference voltage across Zener asymmetrically conducting device 140 appearing at junction 147 to provide a less positive signal at the collector of transistor 136; transistor 135 responds to a less positive signal applied to its base electrode and provides a more positive signal at the base of transistor 134. Transistor 134 responds to this more positive signal by increasing its collector-emitter impedance thus increasing the shunt impedance combination of its collector-emitter path and resistor 133 which, in turn, increases the discharge time of capacitor 132; hence, increasing the phase angle as heretofore discussed. Increasing $\theta$ decreases the positive voltage output thus providing compensation for the original positive output voltage variation.

It should be noted that any driving generator or self-excited inverter configuration may be used as a master inverter in the structure under consideration.

FIGS. 2 and 3 are second and third embodiments of the invention wherein the slave-inverter transistors are connected in the common base and common collector configurations, respectively. The designation numerals of FIGS. 2 and 3 are identical to those of FIG. 1 except that the first digit has been changed to correspond to the figure number. The circuits of FIGS. 2 and 3 function substantially in the same manner as the circuit of FIG. 1. While it is possible with the arrangement shown in FIG. 2 to eliminate two asymmetrically conducting devices and a base current limiting resistor, it has been found that this arrangement does not have the operating capacity of the arrangements shown in FIGS. 1 and 3.

Since changes may be made in the above-described arrangements and different embodiments may be devised by those skilled in the art without departing from the spirit and scope of the invention, it is to be understood that all matter contained in the foregoing description and accompanying drawings is illustrative of the application of the principles of the invention and is not to be construed in a limiting sense.

What is claimed is:

1. A regulator circuit comprising a self-excited transistor core inverter and a separately excited transistor core inverter each having an input and an output, a direct-current source, means for connecting the input of said self-excited inverter and the input of said separately excited inverter to said direct-current source, a load, means for serially connecting said load, said self-excited inverter output and said separately excited inverter output, means for transmitting a driving signal from said self-excited inverter to the input of said separately excited inverter, said driving signal being proportional to the output of said self-excited inverter, a phase change network, said driving signal transmitting means comprising said phase change network, means for connecting said phase change network to said load, said network means being responsive to variations in the load voltage for controlling the phase difference between said self-excited inverter and said separately excited inverter.

2. A regulator circuit comprising a driving generator having an input and an output, a separately excited transistor core inverter having a pair of transistors each having first, second and third electrodes, an inductance device having a plurality of windings, means for connecting the first electrode of each of said transistors, means for connecting the second electrode of each of said transistors, said means comprising one of said plurality of windings, a direct-current source, said direct-current source connecting each of said first electrodes to the said one of said plurality of windings, means for connecting said direct-current source to the input of said driving generator, means for biasing each of said transistors, said means comprising an individual one of said plurality of windings, a load, a capacitor, impedance means responsive to load voltage variations, means for transmitting a driving signal from said driving generator to the third electrode of each of said transistors, said means comprising said capacitor, said impedance means and said biasing means, means for serially connecting said load, said driving generator output and another of said plurality of windings.

3. A regulator circuit comprising a square-wave generator having an input and an output, a separately excited inverter comprising first and second transistors each having base, collector and emitter electrodes, an inductance device having first, second, third, and fourth windings, first, second, third, and fourth asymmetrically conducting devices, means for connecting the collector electrodes of said first and second transistors, said means comprising said first winding, means for serially connecting the base electrode of said first transistor, said second winding, said first asymmetrically conducting device and the emitter electrode of said first transistor, means for serially connecting the base electrode of said second transistor, said third winding, said second asymmetrically conducting device and the emitter electrode of said second transistor, first and second direct-current sources, means for connecting one terminal of said first direct-current source to said first winding, means for connecting the other terminal of said first direct-current source to the emitter electrode of each of said transistors, said means comprising said third and fourth asymmetrically conducting devices, means for connecting said second direct-current source to the input of said square-wave generator, a load, means for serially connecting said load, said square-wave generator output and said fourth winding, a capacitor, impedance means, control means comprising said impedance means, said control means being responsive to load voltage variations, means for transmitting a driving signal proportional to said square-wave generator output to the base electrode of each of said first and second transistors, said means comprising said capacitor, said impedance means and said second and said third windings.

4. A regulator circuit comprising a square-wave generator having an input and an output, a separately excited inverter comprising first and second transistors each having base, collector, and emitter electrodes, an inductance device having first, second, third, and fourth windings, first and second asymmetrically conducting devices, means for connecting the collector electrodes of said first and second transistors, said means comprising said first winding, means for connecting the base electrodes of each of said first and second transistors, means for connecting one terminal of said second winding to one terminal of said third winding, said means comprising said first and said second asymmetrically conducting devices, first and second direct-current sources, means for connecting said first winding to said first and second asymmetrically conducting devices, said means comprising said first direct-current source, means for connecting said second direct-current source to the input of said square-wave generator, means for connecting the base electrodes of said first and second transistors to said first and second asymmetrically conducting devices, a load, a capacitor, impedance means, control means connected to said impedance means, said control means being responsive to load voltage variations, means for transmitting a driving signal proportional to said square-wave generator output to the emitter electrodes of each of said first and second transistors, said means comprising said capacitor, said impedance means and said second and third windings, means for serially connecting said load, said square-wave generator output and said fourth winding.

5. A regulator circuit comprising a square-wave generator having an input and an output, a separately excited inverter comprising first and second transistors each having base, collector, and emitter electrodes, an inductance device having first, second, third, and fourth windings, first, second, third, and fourth asymmetrically conducting devices, means for connecting the collector electrodes of said transistors, means for connecting the emitter electrodes of said transistors, said means comprising said first winding and said first and second asymmetrically conducting devices, means for serially connecting the base electrode of said first transistor, said second winding, said third asymmetrically conducting device and the emitter electrode of said first transistor, means for serially connecting the base electrode of said second transistor, said third winding, said fourth asymmetrically conducting device and the emitter electrode of said second transistor, first and second direct-current sources, said first direct-current source connecting each of said collector electrodes to said first winding, means for connecting said second direct-current source to the input of said square-wave generator, a load, a capacitor, impedance means, control means connected to said impedance means, said control means being responsive to load voltage variations, means for transmitting a driving signal proportional to said square-wave generator output to the base electrodes of each of said first and second transistors, said means comprising said capacitor, said impedance means and said second and third windings, means for serially connecting said load, said square-wave generator output and said forth winding.

6. A regulator circuit comprising a square-wave generator having an input and an output, a separately excited inverter comprising first and second transistors each having base, collector, and emitter electrodes, an inductance device having first, second, third and fourth windings, first, second, third and fourth asymmetrically conducting devices, means for connecting the collector electrodes of said transistors, said means comprising said first winding, first and second resistors, means for serially connecting the base electrode of said first transistor, said second winding, said first asymmetrically conducting device, said first resistor and the emitter electrode of said first transistor, means for serially connecting the base electrode of said second transistor, said third winding, said second asymmetrically conducting device, said second resistor and the emitter electrode of said second transistor, first and second direct-current sources, means for connecting one terminal of said first direct-current source to said first winding, means for connecting the other terminal of said first direct-current source to the emitter electrodes of each of said ransistors, said means comprising said third and fourth asymmetrically conducting devices, means for connecting said second direct-current source to the input of said square-wave generator, a load, an inductor, first and second capacitors, impedance means, control means connected to said impedance means, said control means being responsive to output load voltage variations, means for transmitting a driving signal proportional to said square-wave generator output to the base electrodes of each of said transistors, said means comprising said first capacitor, said impedance means and said second and third windings, a full-wave rectifier having input and output terminals, means for serially connecting the input terminals of said full-wave rectifier, said square-wave generator output and said fourth winding, means for serially connecting the output terminals of said full-wave rectifier, said inductor, and said load, means for connecting said second capacitor across said load.

7. A regulator circuit comprising a square-wave generator having an input and an output, a separately excited inverter comprising first and second transistors, each having base, collector and emitter electrodes, an inductance device having first, second, third and fourth windings, first and second asymmetrically conducting devices, means for connecting the collector electrodes of said first and second transistors, said means comprising said first winding, means for connecting the base electrodes of said first and second transistors, means for connecting one terminal of said second winding to one terminal of said third winding, said means comprising said first and second asymmetrically conducting devices, first and second direct-current sources, means for connecting said first winding to said first and second asymmetrically conducting devices, said means comprising said first direct-current source, a resistor, means for connecting the base electrodes of said first and second transistors to said first and second asymmetrically conducting devices, said means comprising said resistor, a load, first and second capacitors, impedance means, control means connected to said impedance means, said control means being responsive to output load voltage variations, means for transmitting a driving signal proportional to said square-wave generator output to the emitter electrodes of each of said transistors, said means comprising said first capacitor, said impedance means, and said second and third windings, a full-wave rectifier having input and output terminals, an inductor, means for serially connecting the input terminals of said full-wave rectifier, said square-wave generator output and said fourth winding, means for serially connecting the output terminals of said full-wave rectifier, said inductor and said load, means for connecting said second capacitor across said load.

8. A regulator circuit comprising a square-wave generator having an input and an output, a separately excited inverter comprising first and second transistors each having base, collector and emitter electrodes, an inductance device having first, second, third, and fourth windings, first, second, third, and fourth asymmetrically conducting devices, means for connecting the collector electrodes of said transistors, means for serially connecting the emitter electrodes of said transistors, said means comprising said first winding and said first and second asymmetrically conducting devices, first and second resistors, means for serially connecting the base electrode of said first transistor, said second winding, said third asymmetrically conducting device, said first resistor and the emitter electrode of said first transistor, means for serially connecting the base electrode of said second transistor, said third winding, said fourth asymmetrically conducting device, said second resistor, and the emitter electrode of said second transistor, first and second direct-current sources, said first direct-current source connecting each of said collector electrodes to said first winding, means for connecting said second direct-current source to the input of said square-wave generator, a load, first and second capacitors, impedance means, control means connected to said impedance means, said control means being responsive to load voltage variations, means for transmitting a driving signal proportional to said square-wave generator output to the base electrodes of each of said transistors, said means comprising said first capacitor, said impedance means and said second and third windings, a full-wave rectifier having input and output terminals, an inductor, means for serially connecting the input terminals of said full-wave rectifier, said square-wave generator output and said fourth winding, means for serially connecting the output terminals of said full-wave rectifier, said inductor and said load, means for connecting said second capacitor across said load.

References Cited in the file of this patent

UNITED STATES PATENTS

| | | |
|---|---|---|
| 2,896,146 | Jenkins | July 21, 1959 |
| 2,959,726 | Jensen | Nov. 8, 1960 |
| 2,965,856 | Roesel | Dec. 20, 1960 |